Figure 1:
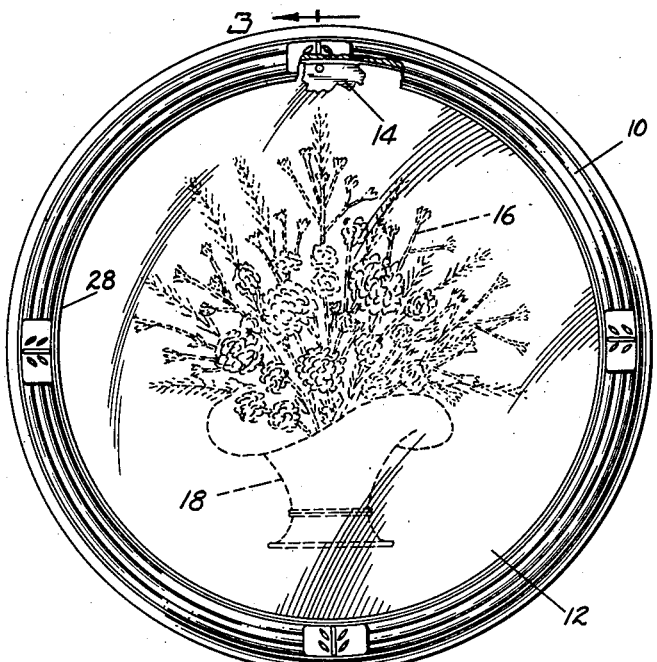

Feb. 23, 1943.  E. S. THRASHER  2,312,007
DISPLAY ARTICLE AND METHOD OF MANUFACTURING SAME
Filed Sept. 9, 1940  3 Sheets-Sheet 1

INVENTOR.
Elmer S. Thrasher
BY Parker & Burton
ATTORNEYS

Feb. 23, 1943. E. S. THRASHER 2,312,007
DISPLAY ARTICLE AND METHOD OF MANUFACTURING SAME
Filed Sept. 9, 1940 3 Sheets-Sheet 2

INVENTOR.
Elmer S. Thrasher
BY
Parker & Burton
ATTORNEYS

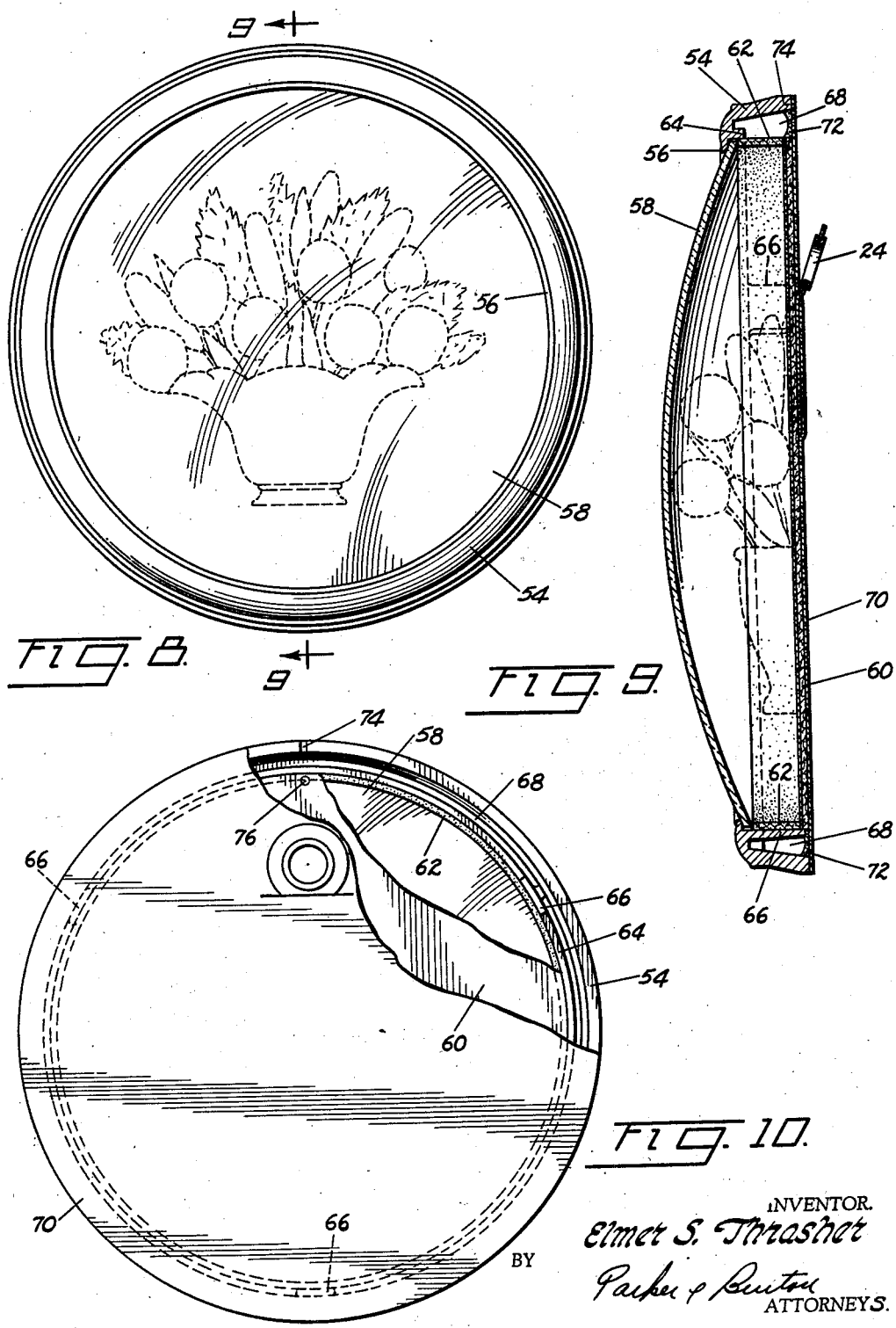

Patented Feb. 23, 1943

2,312,007

UNITED STATES PATENT OFFICE 2,312,007

DISPLAY ARTICLE AND METHOD OF MANUFACTURING SAME

Elmer S. Thrasher, Detroit, Mich.

Application September 9, 1940, Serial No. 355,897

15 Claims. (Cl. 40—160)

This invention relates to a novel display article having a supporting frame enabling it to be attached to a wall or the like and to a novel method of assembling the articles.

Heretofore picture frames have generally been formed of wooden parts, usually one to each side which are joined at the ends in any suitable way. A transparent member such as glass was laid against a supporting ledge in the frame. Against this glass was placed a sheet containing a display exposed to view through the glass. To the back side of the sheet was pressed a flat supporting member of slightly less size than the inside dimension of the frame. This last member was secured in place by nails driven into the inside wall of the frame. These nails were left to project so as to retain the supporting member and display sheet immovably against the glass member.

The invention contemplates a distinctly novel form of frame assemblage for displaying pictures and the like on walls. In place of the old type of wooden frames made of several parts, the present invention utilizes a frame formed of molded hardened plastic material and so shaped as to cooperate in an improved way with the parts of the article contained therewithin. The transparent member through which the display or picture is viewed and the supporting members or sheets therefor are all assembled in the frame and secured against movement therein in a particular novel way. In place of nails as heretofore the back supporting sheet of the assembled article is adhesively secured to the frame in an improved manner.

In the embodiment of the invention described herein the frame is circular but it is understood it may be in any other formation such as elliptical or rectangular. It is a molded hardened plastic frame especially shaped in the molding process with novel features which provide quick and inexpensive assembling operations. The frame is specially shaped in the molding process with projecting shoulders or flanges which aid in the assembling procedure yet are harmoniously and inconspicuously associated with the design on the front face of the frame. One flange projects outwardly from the rear side of the frame and serves to support the frame in the assembling operation. Another flange projects inwardly from the front side of the frame and functions as a seat against which the glass member and the display and supporting sheets are held in fixed position. The frame is further shaped in the molding process with a novel groove or recess opening out on the back side and extending around the frame. This recess functions as a pocket for the bulk of the adhesive material utilized in place of nails for securing the back sheet to the frame.

An important feature of the invention is the novel method of making these framed articles quickly and inexpensively. Novel supporting members are provided which are not only shaped to assist in supporting the frames during the assembling operation but also are weighted so that when both the members and articles assembled thereon are stacked one above the other the weight exerted by the members serves to press the adhesively secured parts together until the adhesive has taken a permanent set. A novel series of steps is performed in the assembling operation which accelerates the production and greatly reduces the cost of manufacture.

Figure 3:
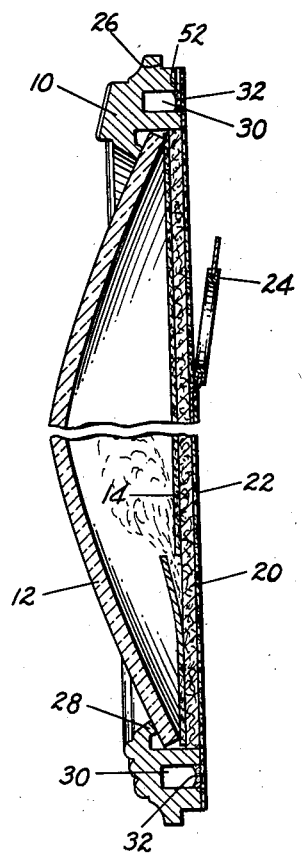
Figure 2:
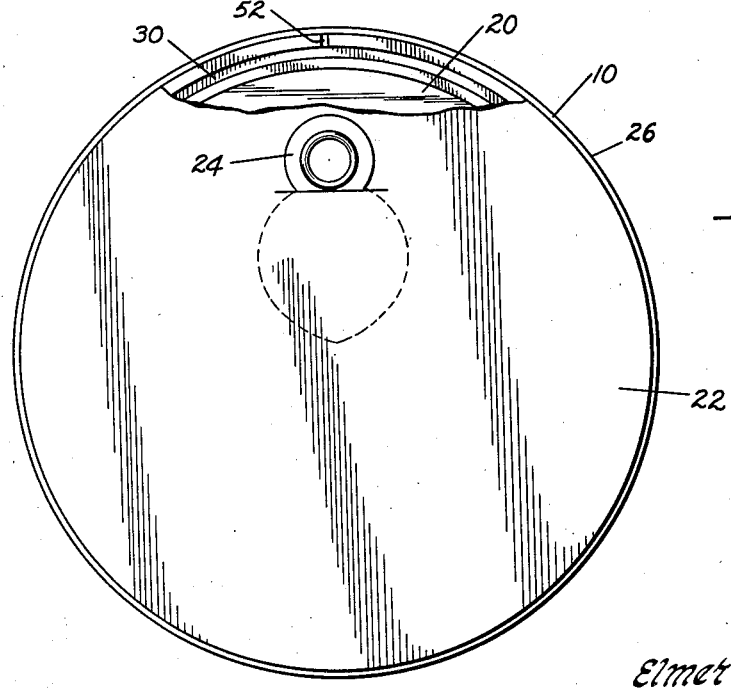
Figure 4:
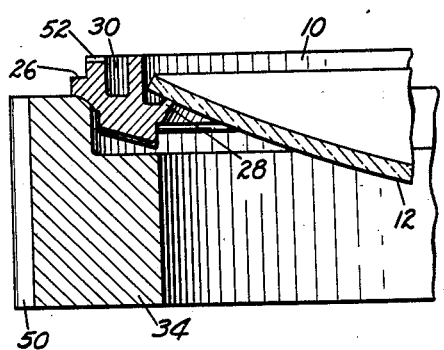
Figure 5:
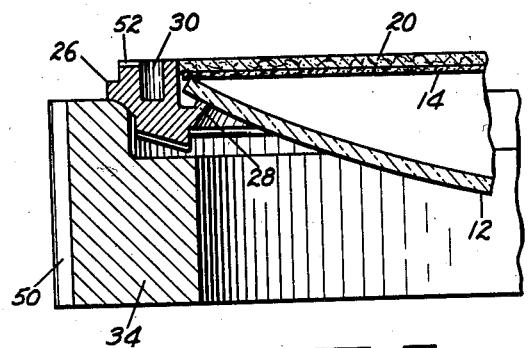
Figure 6:
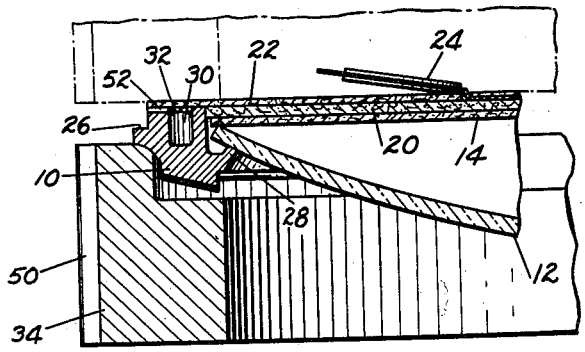
Figure 7:
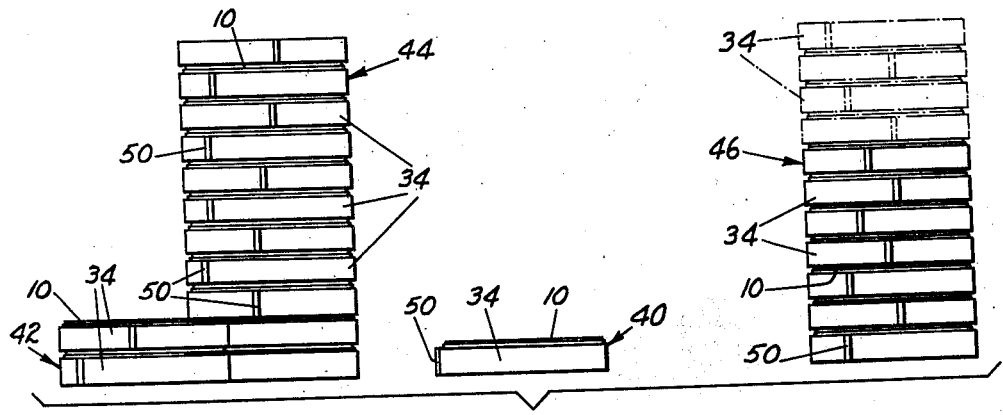

Various other objects, advantages and meritorious features will become more fully apparent from the following specification, appended claims and accompanying drawings, wherein:

Figure 1 is a front elevation of the completed framed article partially broken away to show how the parts are brought into registration in the assembling operation, Fig. 2 is a back elevation of the article in Fig. 1 also partially broken away to show how these parts are brought into registration in the assembling operation, Fig. 3 is a vertical cross-sectional view through the article along line 3—3 of Fig. 1, Figs. 4, 5 and 6 are fragmentary sectional views illustrating a series of successive steps in the assembling operation, Fig. 7 is a view of a plurality of article assembling devices and the manner of quickly assembling the articles and utilizing weighted supports to tightly secure adhesively secured parts of the article, Fig. 8 is a front elevation of the improved article, Fig. 9 is a vertical sectional view taken on line 9—9 of Fig. 8, and Fig. 10 is a rear elevation of the article shown in Fig. 8 partly broken away to show a construction.

The article formed in accordance with this invention includes a frame, a transparent member such as glass, and display and supporting members or sheets arranged behind the glass in the frame. The display or picture is carried on the sheet immediately adjacent to the glass and is viewable therethrough as customary. The frame is formed of hardened plastic material specially molded to aid in the assembling operation and the attachment of the parts. Although the invention is especially adapted for circular framed articles having a convex glass member, it is also applicable to frames of other shapes fitted with glass members of other shapes.

The illustrated embodiment of the invention herein relates to the types of articles for which this invention is particularly adapted, namely, a circular or rounded frame having a convex glass member fitted therein. Referring to the drawings, the circular frame is indicated at 10. It is formed of hardened plastic material molded to the desired shape. The plastic material is preferably a synthetic resinous base. Associated with the frame is a circular glass member 12 having a convex curvature. Viewable through the glass is a member or sheet 14 carrying a picture or a display. An attractive three dimensional display is formed by a spray of artificial flowers supported in a slit in the sheet 14. A floral display of this character is represented in dotted outline at 16 in Fig. 1. The slit is preferably along the top line of the basket represented in dotted outline at 18. The convex character of the glass permits the floral display to project laterally from the face of the sheet 14. In back of the display sheet 14 is a supporting sheet 20. Rearwardly of the sheet is a backing sheet 22 to which is affixed a hook 24 or other form of attachment for securing the article to a wall.

The parts of the assemblage heretofore described are shaped so that they may be quickly and easily assembled and permanently secured together. The frame member 10 is molded with an outwardly extending circular shoulder or ledge 26 which cooperates with a novel assembling support described hereinafter. This shoulder blends harmoniously with the designs molded on the front face of the frame as is apparent in Fig. 1. The frame is also provided with an inwardly extending shoulder or flange 28 formed in the molding process which serves as a seat for retaining the glass member 12 in position. This shoulder extends around the frame and projects rearwardly as Fig. 2 indicates. The portion of the shoulder against which the glass member bears is inclined to the radius of the frame to conform to the curvature of the glass member at the point of contact.

The frame is also shaped in the molding process with a groove or recess 30 which opens out on the rear side of the frame and extends therearound. The annular recess as will be hereinafter described serves as a pocket for catching and holding adhesive material for securing the back sheet 22 to the frame. The recess is made relatively deep as the drawing indicates in order to lighten the frame and save in material. It may, however, be relatively shallow and serve only the purpose of providing a pocket for the adhesive material.

The glass member 12, display sheet 14 and supporting sheet 20 are all of approximately the same diameter, being of such a size as to fit into the opening in the frame from the back side but too large to pass beyond the shoulder 28. As shown, the marginal portion of the convex glass member bears on the shoulder. The display sheet and the supporting sheet therebehind bear against the edge of the glass member. The parts of the article are so related to one another in thickness that the back side of the supporting sheet 20 extends substantially flush with the back side of the frame.

The backing sheet 22 lies against the back side of the supporting sheet 20 but is of such a diameter that it overlaps upon the back side of the frame and across the annular recess 30 therein. The supporting sheet 20 is preferably a relatively stiff cardboard paper. The backing sheet 22 is preferably a thinner, more flexible paper sheet. The backing sheet is secured by adhesive material to the frame. The major portion of this adhesive material is lodged in the recess 30 as indicated at 32 in Fig. 3. Some of this adhesive material is spread thin on the back side of the frame. As a result, the adhesive material does not bulge out from the backing sheet which would otherwise take place if the recess 30 were omitted. The backing sheet 22 will, as a result, lie flat making it less likely to be torn from the frame.

Figures 4 to 7 depict a quick and inexpensive procedure for assembling the article. The frame is first laid face down upon a ring-shaped support 34. This ring support is preferably formed of relatively heavy metal material such as iron to act as a weight as will be described later. The top inner side of the ring is cut away to form a shoulder for engagement with the projecting flange 26 on the frame. The face of the frame 10 is supported free of the ring in order not to be damaged thereby during the assembling operation. After the frame is laid face down on the ring in the manner shown the convex glass is dropped into place against the shoulder 28. The display sheet 14 and the supporting sheet 20 are next placed in position in the order named. The article has now reached the condition shown in Fig. 5.

As previously described, the back side of the supporting sheet 20 lies substantially flush with the back side of the frame. Adhesive material is now applied to secure the backing sheet 22 to the article. This is accomplished by spreading a thin layer of suitable pasting material over the back side of the sheet 20 and on to the frame. This adhesive material is preferably spread by a brush working outwardly from the center of the supporting sheet 20. Most of the paste is preferably applied on or near the frame. The edges of the recess 30 act as a trap catching the major portion of the adhesive material as it is brushed across. This insures a sufficient amount of adhesive material at the place needed most, that is, along the back side of the frame.

After the application of the adhesive material the backing sheet 22 carrying the attaching hook 24 is laid flat on the back side of the sheet 20. The marginal portions are pressed down upon the frame to seal the same thereto. Upon the top of the backing sheet a weight is preferably placed until the adhesive material takes a permanent set.

A specially desirable way of manufacturing these articles is to use a plurality of weighted ring-shaped supports of the type previously described. As each assembling operation is completed, both the ring support and the assembled pasted articles are set aside and stacked one above the other. The weight of the ring supports superimposing each assembled article presses down upon the marginal portions of the backing sheet and holds it in close relation to the frame as the adhesive material takes a permanent set.

Figure 7 illustrates how the method may be performed quickly and inexpensively. The central ring 40 contains the last assembled article. It will be placed upon the two previously assembled articles now forming a short stack 42 to the left. The higher stack 44 consists of assembled articles and their respective ring supports which were completed a short time previously. They have been allowed to stand one upon the other while the adhesive material takes a permanent set. The stack 46 to the right consists of ring supports and their respective assembled articles which were assembled before any of the others and the paste material used has now taken a permanent set. The stack therefore may be broken down by disassociating the assembled frames from their ring supports. In the production process this is preferably accomplished by gradually removing the ring members from the top of the stack 46 as they are needed to form supports for new frame articles. The dotted line representation of the first three ring supports on stack 46 shows the position previously occupied by the ring support 40 and the two rings constituting the short stack 42. Thus a continuous production is insured, the ring-shaped members being used over and over again as the adhesive material in the stacks assume a permanent set.

Usually the articles manufactured in accordance with this method have to assume an upright position on the wall for proper display. Moreover, when the frame has a molded design on its face of the type shown, it must bear a definite relationship to the display. In order to bring the various parts of the article into registration as it is assembled, certain reference marks are provided for guiding the operator. In the first place, each ring-shaped support 34 is provided with a narrow vertical projection shown at 50 in Figs. 4 and 6 and on certain of the rings in Fig. 7. At the time the frame 10 is molded it is preferably provided with a notch 52 on the back side thereof which will designate the top of the frame when the article is hung on the wall. When the frame is laid on the ring it is turned until the notch is aligned with the projection 50 on the ring. The display sheet is also marked at the top on both sides and when laid upon the convex glass is turned until its reference mark is opposite the notch 52 and the projection 50 on the ring. When the backing sheet is pasted down it should be positioned so that the hook 24 extends upwardly toward the projection on the ring. Thus all parts of the article are quickly and easily brought into registration during the assembling operation.

In Figures 8, 9 and 10, a modification is illustrated which enables a larger and thicker display to be exhibited. A special feature is the provision of a member of inexpensive material which is associated with the frame to provide the recess 30 heretofore described. Since the frame is wider in width than the first described embodiment of the invention, it would be comparatively heavy and expensive to make. The new feature, however, reduced the amount of plastic material necessary for the frame and lightens the weight thereof.

Referring to Figs. 8, 9 and 10. The frame indicated at 54 is composed of hardened plastic material molded into the desired shape. It is provided with an inwardly extending shoulder 56 on the front side against which a transparent member 58 seats as in the previous embodiment of the invention. For comparatively thick displays, the transparent member is convex as indicated. In the previous embodiment, the display sheet 14 bears upon the convex glass member. In the present instance, the sheet 60 carrying the display is spaced from the glass by a ring-shaped member 62 associated with the frame. The ring-shaped member is preferably formed of cardboard or other light and inexpensive material. It is of less diameter than the frame and when concentrically arranged therewithin an annular recess opening out on the back side of the device is provided. A small ridge 64 formed integrally on the frame serves as a mounting for holding the ring-shaped member concentric to the frame. At spaced intervals this ridge may be extended to provide rearwardly projecting flanges or fingers 66 which aid in supporting the ring-shaped member in proper position.

The display sheet 60 is preferably formed of cardboard material and is of a diameter substantially that of the outside diameter of the ring member 62. It bears against the outer edge of the latter. When thus disposed it extends substantially flush with the back side of the frame. As previously described, the ring member 62 when properly assembled is spaced from the frame on all sides. This provides a recess 68 like the recess 30 in the previously described modification. When a back supporting sheet 70 is laid over the display sheet and frame it will extend over the recess 68. In the assembling process, adhesive material may be spread or brushed over the back side of the display sheet and into the recess as indicated at 72. The backing sheet 70 is simply laid flat against the back side of the display sheet and adhesively secured thereto. The adhesive material in the recess bonds the backing sheet to the frame and secures all the parts in fixed relation in the frame. As in the previously described embodiment, the frame and backing sheet may be provided with reference marks 74 and 76 to line the two elements in proper relation in the assembling procedure.

What I claim is:

1. An article for displaying pictures and the like upon a wall comprising, in combination, a circular frame composed of hardened plastic material having a flange extending radially inwardly from the front side thereof, said frame further provided with a circular recess in the back side between the outer and inner edges thereof, a convex glass member having a diameter such that its marginal portion will bear against said seat forming flange, a member within said frame carrying a display which is viewable through said convex glass member, a circular member of relatively stiff paper material having a diameter substantially that of the glass member and arranged behind said display carrying member to serve as a support therefor, a circular member of more flexible paper material having a diameter substantially that of the outer dimensions of the frame and arranged against the back side of the frame with the marginal portions bearing against the back side of the frame on opposite sides of the circular recess, adhesive material in said recess securing said second larger circular member to the frame, and means on said last member for hanging the device on a wall.

2. A picture frame formed of molded hardened plastic material, said frame formed with a shoulder on the front side projecting inwardly on all sides, a transparent element having its marginal portions seated upon said shoulder, a member of cardboard material or the like corresponding substantially in size and shape to the transparent element and bearing against the back side thereof opposite to the marginal portions engaged by said shoulder, said member having a dimension perpendicularly of the plane of the frame such that when bearing against the back edge of the transparent element it extends substantially flush with the back side of the frame, and means carried by the frame supporting said member in slightly spaced relation to the inside surfaces of the frame and forming in combination therewith an annular recess opening out on the back side of the frame, and a supporting sheet extending across the back side of the frame over the opening of said recess and secured to the frame by adhesive material lodged in said recess.

3. A device of the character described comprising, in combination, a frame formed of molded plastic material and provided with an inwardly extending flange on the front side thereof, a transparent element fitted in said frame and seated on said flange, a member of non-moldable plastic material corresponding in shape to the general shape of the frame but being of a lesser dimension such that when it is positioned in the frame equally spaced from all sides thereof it bears upon the marginal portion of said transparent element and forms a channel between the member and the sides of the frame which opens out in the rear side of the latter, said member having a width such that when it bears against the marginal portions of the transparent element it extends substantially flush with the rear side of the frame, and adhesive substance in the channel formed by said frame and member securing said sheet material to the frame to retain said transparent element and said member within the frame.

4. A device of the character described comprising, in combination, a circular frame formed of molded hardened plastic material in the form of a ring provided with an inwardly projecting shoulder formed integrally thereon, a circular transparent element fitting the hole in said frame and having its marginal portions seated upon said shoulder, a ring-shaped member of cardboard or the like corresponding substantially in size to the transparent element and bearing against the back side thereof opposite to the marginal portions engaging said shoulder, said member being of such a diameter that when concentrically mounted in the frame it is slightly spaced from the inside surfaces thereof, means forming part of the frame engaging said member and acting to support the member concentrically within the frame in slightly spaced relationship to the inside surfaces thereof, a circular sheet of cardboard or the like of substantially the same diameter as the ring-shaped member and abutting the rear side thereof, said sheet carrying a picture display, and a covering extending over the back side of the sheet and upon the back side of the frame and secured to the latter to hold the display carrying sheet in assembled relation.

5. The method of making a circular picture display device to be hung on the walls which comprises molding a circular frame of plastic material with an inwardly projecting shoulder on the front side thereof and an outwardly projecting shoulder on the periphery thereof and with a circular recess opening out on the rear side of the frame, utilizing the outwardly projecting shoulder on the frame to support the same face down upon a ring shaped of substantially the same diameter, laying a circular convex transparent member of a size equal to or slightly less than the inside diameter of the frame upon the inwardly extending shoulder thereof, placing a circular sheet of a diameter substantially that of the convex transparent member upon the outer edges thereof carrying a display on the side adjacent to the convex member, placing a circular supporting sheet of substantially the same diameter as the display sheet upon the back side of the latter, spreading adhesive material on the back side of the frame and in the recess opening out thereof, placing a second circular supporting sheet of substantially the same diameter as the outside diameter of the frame upon the back side of said first described supporting sheet, and securing the marginal portions of the second supporting sheet to the frame by the adhesive material spread on the back thereof.

6. The method of making a plurality of picture display articles which comprises molding a plurality of correspondingly shaped annular frames of plastic material and providing each frame with a decorated front face and peripheral shoulder, taking each frame in succession and positioning it face down upon a weighted metal member having a raised portion shaped to engage the peripheral shoulder on the frame and support the front decorated face free thereof, assembling parts of a display in each frame while in the face down supported position, adhesively securing a sheet over the back of the frame, and immediately stacking each frame and weighted member assembly in a vertical pile so that the weight of the members in the stack bears directly upon the adhesively secured portion of the sheet on the back of the next lowermost frame and retaining the stack until the adhesively secured parts are permanently adhered together.

7. In combination with a picture frame having a shoulder projecting outwardly from the frame on all sides thereof, a member composed of heavy material having the general shape of the frame, said member shaped with a shoulder on all sides thereof having the same dimensional characteristics as the shoulder on the frame and adapted to form a seat upon which the shoulder on the frame may be laid when the frame is laid on the member.

8. In combination with a picture frame formed of molded hardened plastic material and shaped with a shoulder projecting from the outside surface of the frame on all sides thereof, a member composed of heavy metal and formed into a ring having the general shape of the frame, said member shaped with a step on one face thereof extending around the member and forming a shoulder of the same dimension as the shoulder on the frame, a convex transparent element adapted to fit into the opening of the frame and be carried therein, said frame adapted to be supported on the heavy ring member with the intermediate portions of said convex element projecting into the opening of the ring member by laying the shoulder of the frame on the shoulder of the ring member.

9. In combination with an annular shaped picture frame formed of molded hardened plastic material with a design on the front face thereof and an integrally formed shoulder which projects from the periphery of the frame in a plane recessed back from the front face thereof, an annular shaped member composed of heavy metal material having the general shape of the frame, said member having a bottom side adapted to be laid horizontally upon a support and having its top face formed with a circular step which disposes the inner marginal portion of the face below that of the outer marginal portion, said frame adapted to be placed face downward upon the annular member and have the outside shoulder of the frame bear upon the higher outside marginal portion of the top face of the heavy member, the distance separating the levels of the outer and inner marginal portions of the top face of the heavy member being greater than the distance the outer shoulder of the frame is recessed back from the front face thereof whereby the frame may rest face down on the annular member without the design on the front face coming into engagement with the member.

10. In combination, a plurality of similarly shaped annular shaped frames formed of molded hardened plastic material, a plurality of annular weighted members of the same general shape as the frames, said frames each being molded with a decoration on the front face thereof and integrally formed with an outside peripheral shoulder recessed back from the front face and an inside shoulder forming a seat, said annular shaped weighted members each formed with a flat face on one side and a stepped face on the other side, said stepped face having the outer marginal portion raised above the inner marginal portion to form an annular shoulder of the same dimension as the outwardly projecting shoulder on the frames, a convex glass associated with each frame and seated upon the inner shoulder of the frame with the middle portion projecting beyond the front face of the frame, and sheet material adhesively secured to the back side of each frame and forming a flat surface around the margin of the frame, said weighted members and said frames with their associated elements adapted to be alternately stacked in a vertical pile with the outside peripheral shoulders of their frames each bearing on a raised outer marginal portion of the weighted member on one side thereof and the back side abutting the flat face of the weighted member on the other side thereof.

11. An article for displaying pictures and the like upon a wall comprising, in combination, a frame having an integrally formed shoulder extending inwardly on all sides thereof, a glass member or the like of a size to fit in the frame and have its marginal portions bear against said shoulder, a member of a size to fit into the frame and carrying a display viewable through the glass member, a backing sheet of relatively stiff thick paper material of a size to fit into the frame and arranged behind said display member, a second backing sheet of less thickness and of more flexibility than said first sheet lying flat against the back side thereof, said second more flexible sheet being of such a dimension that portion thereof extend across the back side of the frame, one or more recesses formed in said frame under said backing sheet, and adhesive material in said recesses securing said backing sheet to the frame.

12. An article of the character described comprising, in combination, a frame having an opening therethrough, a glass member or the like of a size substantially that of the opening in the frame, a member carrying a display likewise of a size substantially that of the opening in the frame, a relatively thick stiff supporting member of a size substantially that of the opening in the frame, said members arranged in the order described in the plane of the frame with the display of the second member exposed to view through the glass member, said frame having a shoulder forming an integral part thereof projecting inwardly on all sides thereof to form a seat against which the front side of the glass member bears, the thickness of said supporting member being such that when said three members are compactly assembled in the frame and pressed against said shoulder the back side of the supporting member is substantially flush with the back side of the frame, said frame having recesses opening out through the back side thereof, a thin flexible backing sheet of a size substantially that of the outside dimensions of said frame lying flat across said supporting member and having its marginal portions extending over said recesses in the frame, and adhesive material lodged in said recesses serving to secure the marginal portions of said backing sheet to the frame.

13. In combination, a frame having a shoulder projecting outwardly from opposite sides thereof, a member composed of heavy material having the general shape of the frame, said member shaped with a shoulder on opposite sides thereof corresponding in position to the shoulder on the frame and adapted to form a seat upon which the latter may be laid to support the frame on the member, and indicial marks on said frame and said member for bringing the two into proper registration.

14. In combination, an annular shaped picture frame formed of molded hardened plastic material having a design on the front face and an indicial mark on the rear face, said frame having a shoulder projecting outwardly on the several sides of the frame, an annular shaped member composed of heavy material having the general shape of the frame, said member provided with a raised portion adapted to form a seat which will receive the shoulder of the frame and support the latter on the member with the front face down and without the design thereof contacting the member, a sheet adapted to be mounted in the frame and carry a display thereon, said sheet carrying an indicial mark adapted to be brought into registration with the indicial mark on the rear side of the frame, and an indicial mark on the annular member into which both of said other marks are brought into registration.

15. An article of the character described comprising, in combination, an open circular frame formed of hardened plastic material having a decorated front side and a circular recess opening out on the back side between the outer and inner edges of the frame, said frame further provided with an integral shoulder projecting radially inwardly on all sides thereof adjacent to the front face side of the frame, a convex member of glass or the like material having a diameter such that it will project from the front side of the frame with its marginal portion bearing against said shoulder, a relatively thick flat circular supporting sheet having a radial dimension substantially that of said glass member arranged behind the latter and having such a thickness that when bearing against the marginal portion of the glass member and when the latter is pressed against the shoulder its back face will extend substantially flush with the back side of the frame, said supporting sheet carrying a display viewable through said glass member, and a relatively thin flexible circular backing sheet of a size substantially that of the frame extending across the back side of said supporting sheet and the frame, and adhesive material lodged in said recess and acting to secure the marginal portion of the backing sheet to the frame.

ELMER S. THRASHER.